US012761540B2

(12) United States Patent
Kao

(10) Patent No.: US 12,761,540 B2
(45) Date of Patent: Oct. 13, 2026

(54) PROJECTION DEVICE

(71) Applicant: Coretronic Corporation, Hsin-Chu (TW)

(72) Inventor: Fu-Shun Kao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 276 days.

(21) Appl. No.: 18/432,093

(22) Filed: Feb. 5, 2024

(65) Prior Publication Data

US 2024/0272531 A1 Aug. 15, 2024

(30) Foreign Application Priority Data

Feb. 15, 2023 (CN) ......................... 202320218967.1

(51) Int. Cl.

*G03B 21/14* (2006.01)
*F16M 11/16* (2006.01)
*F16M 11/24* (2006.01)
*F16M 13/00* (2006.01)

(52) U.S. Cl.

CPC ........... *G03B 21/145* (2013.01); *F16M 11/16* (2013.01); *F16M 11/24* (2013.01); *F16M 13/005* (2013.01)

(58) Field of Classification Search

CPC ..... G03B 21/00–64; H04N 9/31–3197; F16M 11/00–425; F16M 13/00–08
See application file for complete search history.

(56) References Cited

U.S. PATENT DOCUMENTS 6,715,890 B2 4/2004 Huang et al.

FOREIGN PATENT DOCUMENTS

| | | | | |
|---|---|---|---|---|
| JP | 2004085726 A | * | 3/2004 | ........... G03B 21/145 |
| TW | I592735 B | | 7/2017 | |
| TW | M630480 U | | 8/2022 | |

* cited by examiner

*Primary Examiner* — Christopher A Lamb, II

(57) ABSTRACT

A projection device includes a housing, a rotating component, and a foot pad component. The housing has the first and second parts. The second part has a screw hole. The rotating component has an abutting part and a driving part. The abutting part passes through and abuts against the first part. The foot pad component has a foot pad part, a screw rod part, and a driven-to-move part. The screw rod part is connected between the foot pad part and the driven-to-move part and screwed to the second part through the screw hole. The driven-to-move part is in the housing and embedded in the driving part. The rotating component rotates relative to the first part, causing the foot pad component to be driven by the rotating component to rotate relative to the second part, thereby changing a height of the housing relative to the foot pad part.

15 Claims, 11 Drawing Sheets

PROJECTION DEVICE

CROSS-REFERENCE TO RELATED APPLICATION

This application claims the priority benefit of the China application (No. 202320218967.1), filed on Feb. 15, 2023. The entirety of the above-mentioned patent application is hereby incorporated by reference herein and made a part of this specification.

FIELD OF THE INVENTION

The present invention relates to an imaging device, and more particularly to a projection device.

BACKGROUND OF THE INVENTION

A projection device can include an illumination system, a light valve, and a projection lens. The illumination system can provide a beam, the light valve can convert the beam into an image beam, and the projection lens can project the image beam onto a screen, thereby forming a projection image. Furthermore, foot pads are usually installed at the bottom of the projection device, and the angle of the projection image projected by the projection device can be adjusted through the foot pads to match the screens of different heights. However, most of the foot pads of the conventional projection device have complex structures and are difficult to operate, resulting in users spending a lot of time for adjusting the projection angle of the projection image.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The present invention provides a projection device with the advantages of easy operation and simple structure.

Other advantages and objectives of the invention may be further illustrated by the technical features broadly embodied and described as follows.

In order to achieve one or a portion of or all of the objectives or other objectives, the projection device provided by the present invention includes a housing, a rotating component, and a foot pad component. The housing has a first part and a second part arranged oppositely. The second part has a screw hole. The rotating component has an abutting part and a driving part connected to each other. The abutting part is arranged to pass through and abut against the first part, and the driving part is located inside the housing. The foot pad component has a foot pad part, a screw rod part, and a driven-to-move part. The screw rod part is connected between the foot pad part and the driven-to-move part and is screwed to the second part through the screw hole. The driven-to-move part is located in the housing and is embedded in the driving part. The foot pad part is located outside the housing. The rotating component is configured to rotate relative to the first part, causing the foot pad component to be driven by the rotating component to rotate relative to the second part, thereby changing a height of the housing relative to the foot pad part.

In an embodiment of the present invention, one of the driving part and the driven-to-move part may have a cavity, and the other one of the driving part and the driven-to-move part may have a convex part. The cavity is configured to accommodate the convex part so that the driving part is embedded with the driven-to-move part.

In an embodiment of the present invention, the convex part has, for example, a complementary shape with the cavity. The convex part is configured to cause the driving part to drive the driven-to-move part to rotate when the rotating component rotates.

In an embodiment of the present invention, the rotating component further includes, for example, a guide part. The guide part is connected to the driving part, and the driving part is located between the guide part and the abutting part. The guide part has a guide hole, an open end, and a connecting end. The connecting end is opposite to the open end and connected to the driving part. The open end has an opening. The guide hole extends from the open end to the connecting end and is communicated to the opening and the cavity. A diameter of the guide hole gradually decreases from the open end to the connecting end.

In an embodiment of the present invention, the convex part and the cavity may be clearance fit with each other.

In an embodiment of the present invention, a length of the cavity in an axial direction of an axis of the rotating component is smaller than a length of the screw rod part in the axial direction of the axis of the rotating component.

In an embodiment of the present invention, the abutting part may have an actuating section and an abutting section. The abutting section is connected between the actuating section and the driving part. The actuating section is located outside the housing, and the abutting section is located inside the housing. A portion of the first part is sandwiched between the actuating section and the abutting section.

In an embodiment of the present invention, the abutting section may have a body part and a plurality of hook parts. The body part is connected between the actuating section and the driving part. Each of the hook parts has a fixing end and a hook end opposite to each other. Each of the fixing ends is fixed to the body part, and the hook ends are respectively located between the fixing ends and the actuating section. The hook ends are separated from the body part and protruding from the body part. The portion of the first part is sandwiched between the actuating section and the hook ends.

In an embodiment of the present invention, the portion of the first part may have a through hole. The rotating component is arranged to pass through the through hole. In an axial direction perpendicular to an axis of the rotating component, the hook ends form a maximum width of the abutting section, and the maximum width is greater than a diameter of the through hole.

In an embodiment of the present invention, the abutting section further may have a guiding end. The guiding end is connected to the driving part and opposite to the actuating section. In the axial direction perpendicular to the axis of the rotating component, a width of the guiding end gradually increases from the driving part to the actuating section.

In an embodiment of the present invention, the guiding end may be opposite to the hook ends. In the axial direction perpendicular to the axis of the rotating component, a width of the abutting section between the guiding end and the hook ends is smaller than the diameter of the through hole.

In an embodiment of the present invention, the actuating section may have a knob part, and the knob part protrudes or is embedded in the first part.

In an embodiment of the present invention, the housing may further have a projection side and a back side opposite to each other, and the rotating component and the foot pad component are arranged close to the projection side.

In an embodiment of the present invention, the aforementioned projection device further includes, for example, a limiting ring, sleeved on the driven-to-move part and abutting against the screw rod part. In a radial direction of the screw rod part, a width of the limiting ring is greater than a width of the screw rod part.

In an embodiment of the present invention, the driven-to-move part may be rod-shaped, and the driven-to-move part may have a central axis and an outer surface. The outer surface surrounds the central axis. The outer surface has a groove. The limiting ring has a convex portion corresponding to the groove. The limiting ring is sleeved to the groove, and the convex portion is abutted against an interior of the groove.

In an embodiment of the present invention, the limiting ring may have a fracture, and the fracture corresponds to the driven-to-move part. The limiting ring is configured to be sleeved to the driven-to-move part through the fracture.

The projection device of the present invention adopts a rotating component and a foot pad component, the rotating component can be arranged at the top of the housing (the first part), the foot pad component can be arranged at the bottom of the housing (the second part) and embedded in the rotating component, and the rotating component can drive the foot pad component to rotate together. Thus, when adjusting the angle of the projection image of the projection device, the rotating component can be rotated from the top of the housing so that the foot pad component is driven by the rotating component to extend out or retract into the housing. By changing the height of the housing relative to the foot pad part, the tilt angle of the projection image of the projection device can be changed. Therefore, the projection device of the present invention can adjust the angle of the projection image from the top of the housing, thereby having the advantages of easy operation and simple structure.

Other objectives, features and advantages of the invention will be further understood from the further technological features disclosed by the embodiments of the invention wherein there are shown and described preferred embodiments of the present invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
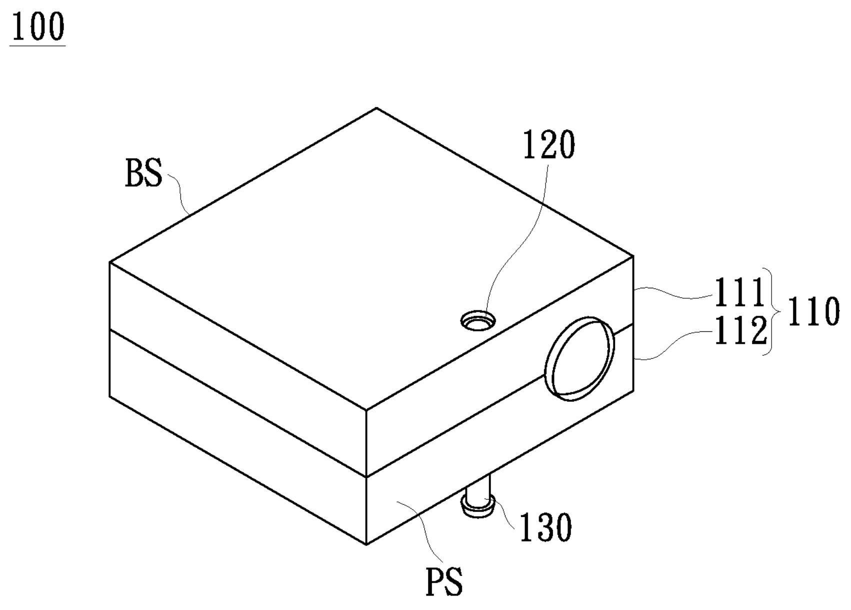
FIG. 1 is a schematic diagram of a projection device in an embodiment of the present invention.
Figure 2:
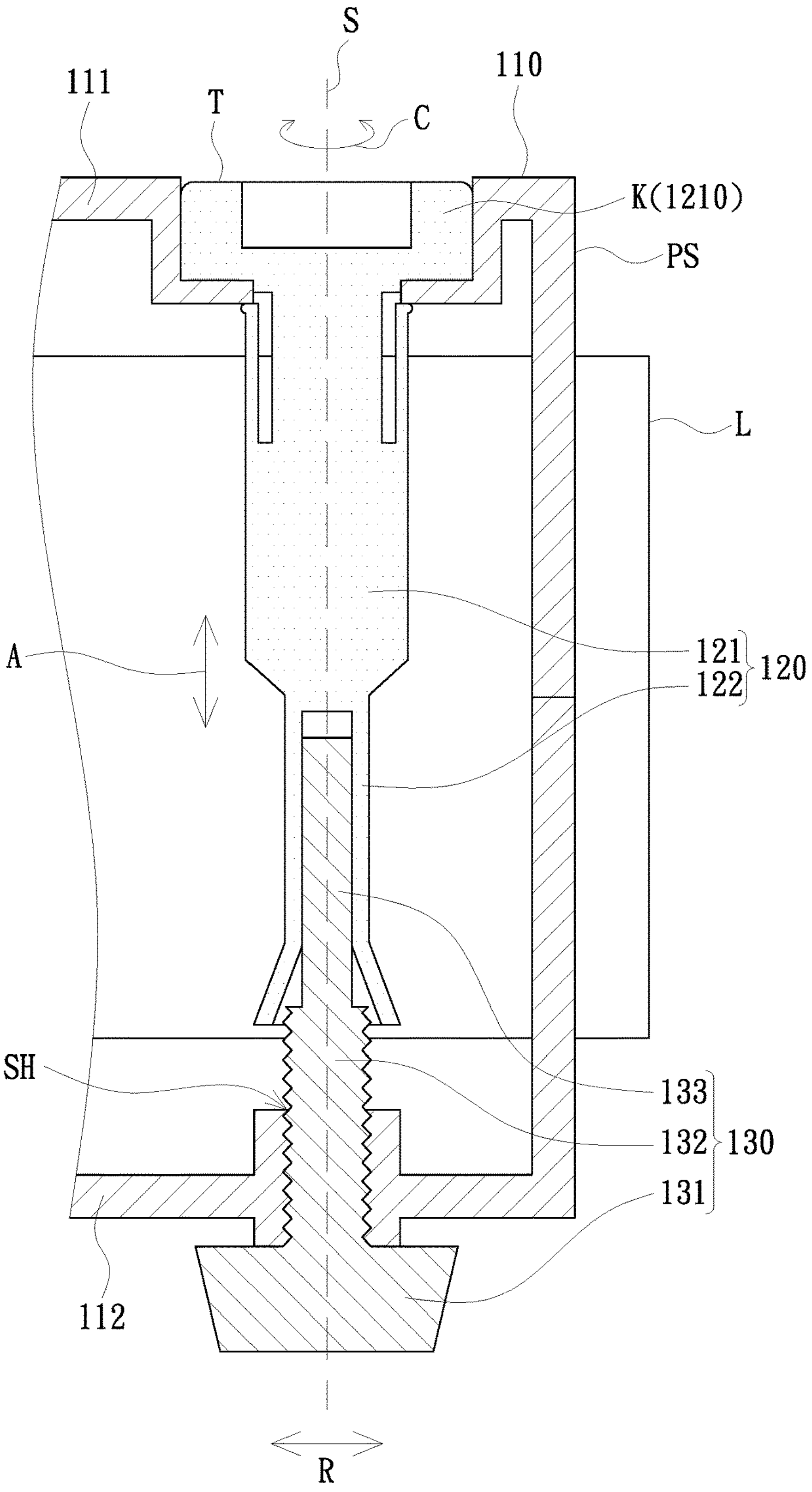
FIG. 2 is a schematic cross-sectional diagram of the projection device shown in FIG. 1.
Figure 3:
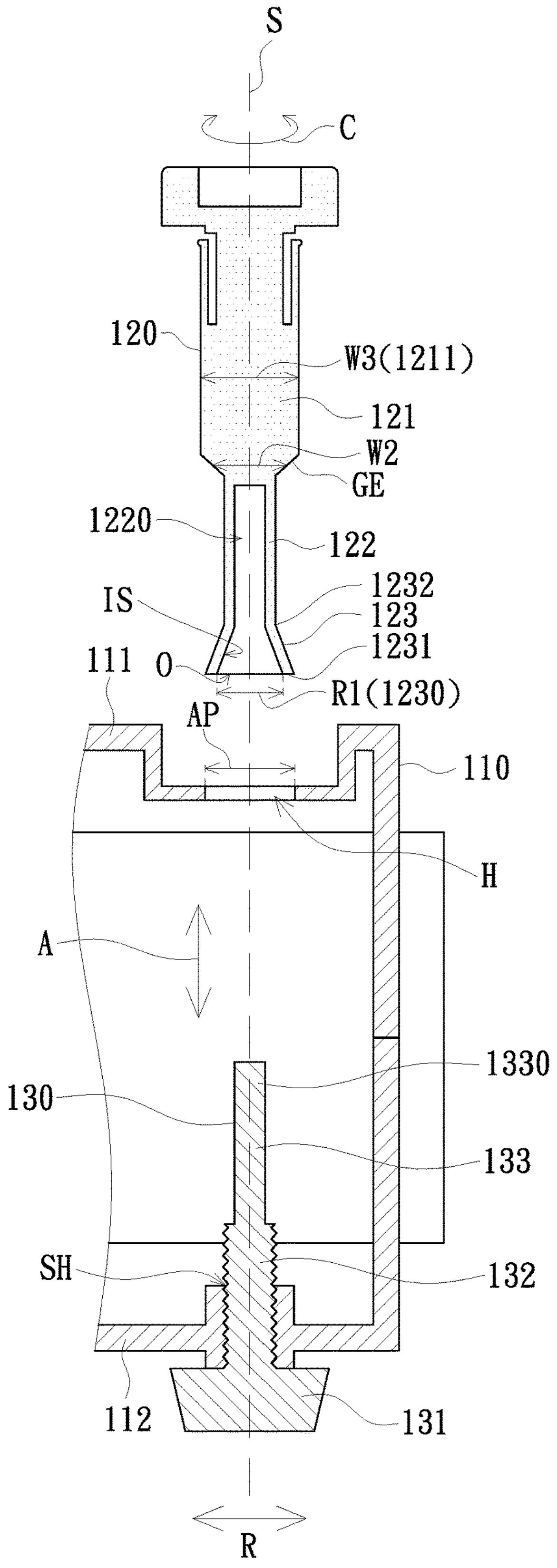
FIG. 3 is a schematic diagram of the separation of the rotating component and the foot pad component in FIG. 2.
Figure 4:
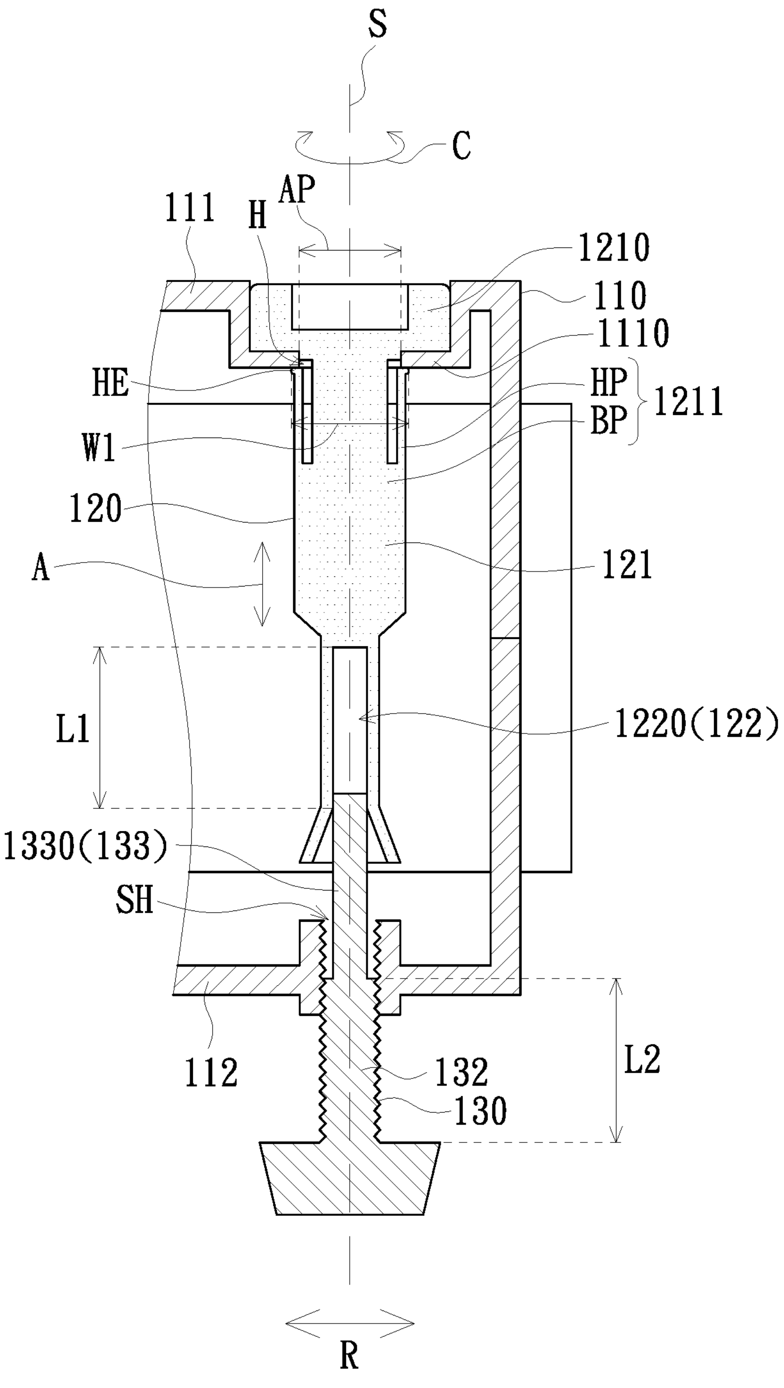
FIG. 4 is a schematic diagram in which the foot pad component in FIG. 2 is driven by the rotating component to extend out of the housing.

FIG. 1 is a schematic diagram of a projection device in an embodiment of the present invention. FIG. 2 is a schematic cross-sectional diagram of the projection device shown in FIG. 1. FIG. 3 is a schematic diagram of the separation of the rotating component and the foot pad component in FIG. 2. FIG. 4 is a schematic diagram in which the foot pad component in FIG. 2 is driven by the rotating component to extend out of the housing.

Please refer to FIG. 1 first. The projection device 100 includes a housing 110, a rotating component 120, and a foot pad component 130. The housing 110 has a first part 111 and a second part 112 oppositely arranged. Please refer to FIGS. 2 and 3. The second part 112 has a screw hole SH (also labeled in FIG. 4). The rotating component 120 has an abutting part 121 and a driving part 122 connected to each other. The abutting part 121 is arranged to pass through and abut against the first part 111, and the driving part 122 is located inside the housing 110. The foot pad component 130 has a foot pad part 131, a screw rod part 132, and a driven-to-move part 133. The screw rod part 132 is connected between the foot pad part 131 and the driven-to-move part 133 and is screwed to the second part 112 through the screw hole SH. The driven-to-move part 133 is located inside the housing 110 and is embedded in the driving part 122. The foot pad part 131 is located outside the housing 110. Please refer to FIGS. 2 and 4. The rotating component 120 is configured to rotate relative to the first part 111, causing the foot pad component 130 to be driven by the rotating component 120 to rotate relative to the second part 112, thereby changing the height of the housing 110 relative to the foot pad part 131.

Please refer to FIGS. 1 and 2. The first part 111 of the housing 110 may be the top of the housing 110, while the second part 112 may be the bottom of the housing 110, for example. Specifically, the rotating component 120 can be arranged to pass through the top of the housing 110, and the foot pad component 130 can be screwed into the bottom of the housing 110. In this way, rotating the rotating component 120 from the top of the housing 110 can drive the foot pad component 130 located at the bottom to rotate together, thereby increasing or decreasing the height of the housing 110 relative to the foot pad part 131. Incidentally, the housing 110 can also have a projection side PS and a back side BS opposite to each other (shown in FIG. 1). The rotating component 120 and the foot pad component 130 are arranged near the projection side PS. Further, the projection side PS can be the side of the housing 110 allowing the projection lens L to project a projection image. In other words, the projection side PS allows the projection lens L to project an image beam. In this embodiment, the rotating component 120 and the foot pad component 130 are arranged approximately at the midpoint of the projection side PS, and the quantities of the rotating components 120 and the foot pad components 130 each can be one. However, the quantities of the rotating components 120 and the foot pad components 130 each can be two in one embodiment, and the two rotating components 120 and the two foot pad components 130 each can be arranged at the opposite ends of the projection side PS, respectively. The present invention does not impose any restrictions on the quantity and position of the rotating components 120 and the foot pad components 130.

Incidentally, in this embodiment, the foot pad component 130 can be assembled to the second part 112 first, and then the rotating component 120 is arranged to pass through the first part 111 and the driven-to-move part 133 is embedded in the driving part 122. However, the present invention does not impose any restrictions on the assembly process of the rotating component 120 and the foot pad component 130.

Please refer to FIGS. 2 and 3 again. The foot pad component 130 is embedded in the driving part 122 of the rotating component 120 through the driven-to-move part 133, and the screw rod part 132 of the foot pad component 130 is screwed to the second part 112. Further, one of the driving part 122 and the driven-to-move part 133 may have a cavity, while the other of the driving part 122 and the driven-to-move part 133 may have a convex part, as shown in FIGS. 3 and 4. For example, in this embodiment, the driving part 122 of the rotating component 120 may have a cavity 1220, while the driven-to-move part 133 of the foot pad component 130 may have a convex part 1330. The cavity 1220 is configured to accommodate the convex part 1330 to cause the driving part 122 and the driven-to-move part 133 to be embedded to each other. More specifically, the convex part 1330 has a shape complementary to the shape of the cavity 1220, for example. The convex part 1330 is configured to cause the driving part 122 to drive the driven-to-move part 133 to rotate when the rotating component 120 rotates.

Figure 5:
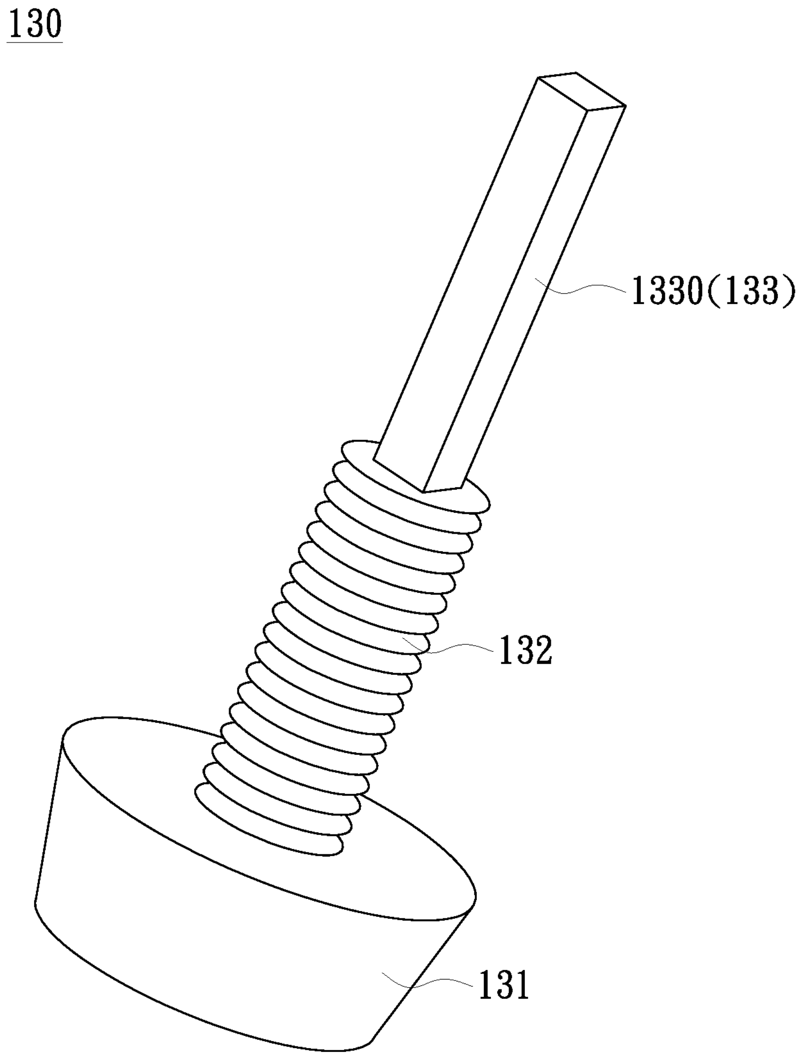
FIG. 5 is a schematic diagram of the foot pad component in FIG. 2.

FIG. 5 is a schematic diagram of the foot pad component in FIG. 2. Refer to FIGS. 4 and 5. Specifically, the convex part 1330 can be in the shape of a polygonal cylinder, and the cavity 1220 can be in the shape of a long hole complementary to the polygonal cylinder, so that the driving part 122 can drive the driven-to-move part 133 to rotate together. In this embodiment, the shape of the convex part 1330 can be a quadrangular column, and the shape of the cavity 1220 can be a long hole in the shape of a quadrangular column, but other embodiments are not limited thereto. For example, in one embodiment, the convex part 1330 may have an end similar to a screwdriver, and the cavity 1220 may have a shape complementary to the aforementioned end. For example, the convex part 1330 or its end can be cross-shaped or flat-head shaped, while the shape of the cavity 1220 corresponds to the end of the convex part 1330, or the end of the cavity 1220 can be a cross-shaped or flat-head-shaped accommodating groove. However, the present invention does not impose any limitations on these details. Incidentally, the convex part 1330 and the cavity 1220 of this embodiment can be clearance fit with each other, making it easier for the convex part 1330 to extend into the cavity 1220 and therefore making it easier for the foot pad component 130 to be assembled to the rotating component 120. For example, the cavity 1220 may be about 0.2 mm to 0.3 mm wider than the convex part 1330 in one embodiment, but the present invention is not limited thereto.

Please refer to FIGS. 2 and 4 again. The rotating component 120 of this embodiment can rotate around the axis S to drive the screw rod part 132 of the foot pad component 130 to extend out or retract into the second part 112 along the axial direction A of the axis S. Further, the axial direction A of the axis S passes through the first part 111 and the second part 112, for example. In addition, the rotating component 120 can rotate relative to the first part 111 along the circumferential direction C of the axis S (also labeled in FIG. 3). Please continue to refer to FIG. 4. In this embodiment, the length L1 of the cavity 1220 in the axial direction A may be smaller than the length L2 of the screw rod part 132 in the axial direction A. In this way, it can further prevent the screw rod part 132 from being continuously driven by the rotating component 120 and detaching from the screw hole SH.

Figure 6:
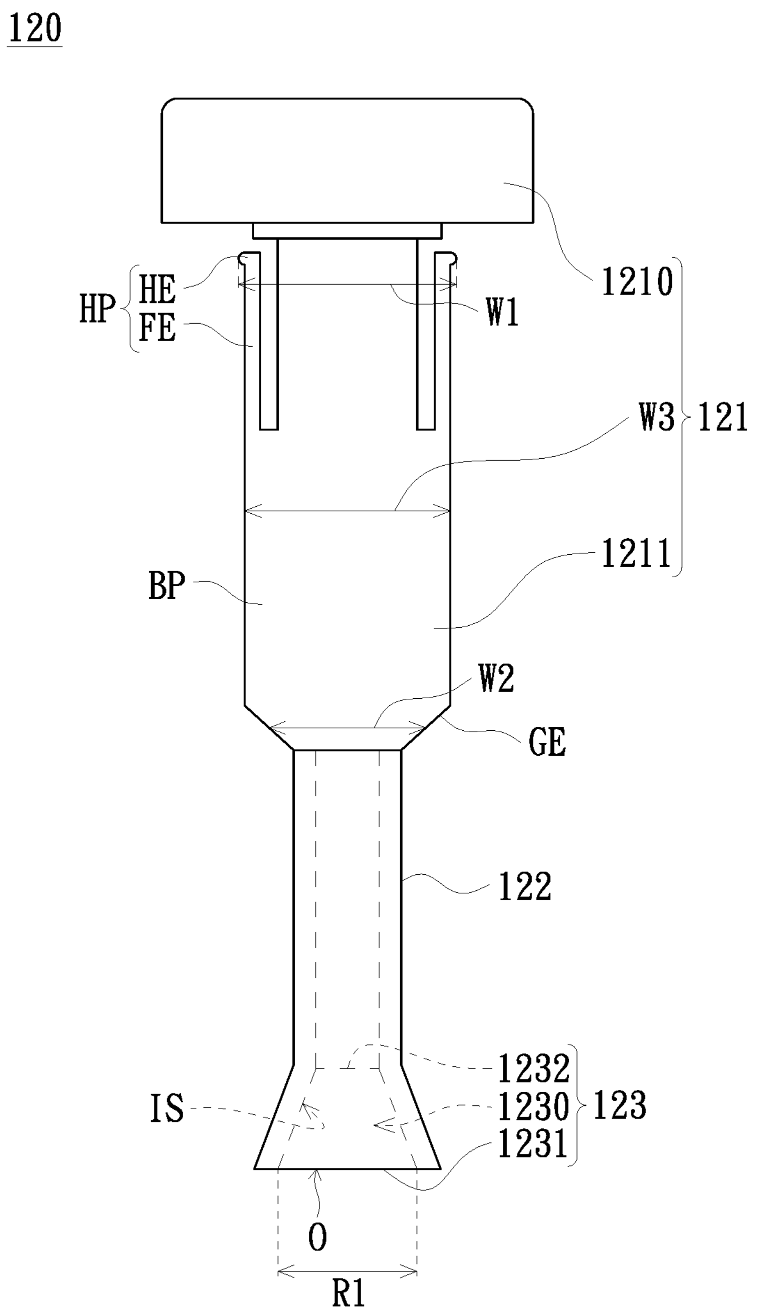
FIG. 6 is a schematic side diagram of the rotating component in FIG. 2.
Figure 7:
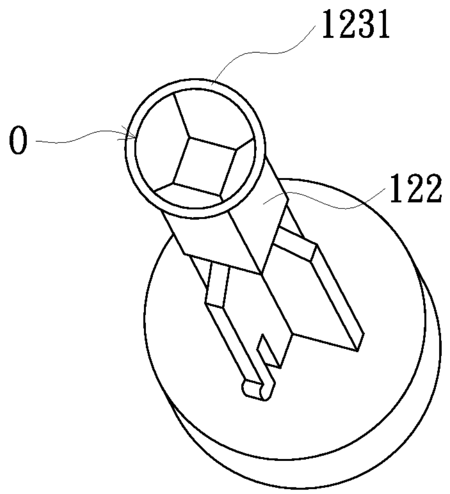
FIG. 7 is a schematic diagram of the rotating component of FIG. 6 from another viewing angle.
Figure 8:
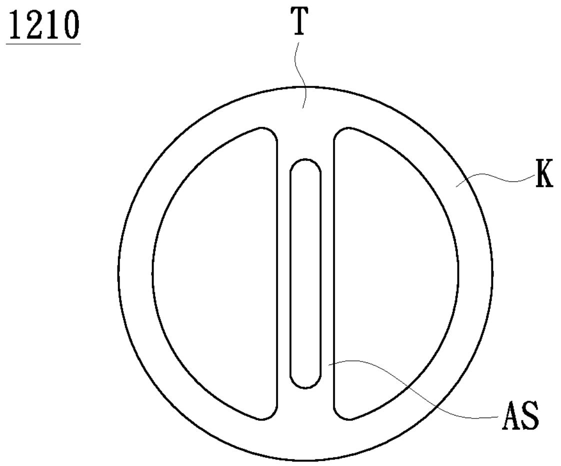
FIG. 8 is a schematic top diagram of the rotating component in FIG. 2.

FIG. 6 is a schematic side diagram of the rotating component in FIG. 2. FIG. 7 is a schematic diagram of the rotating component of FIG. 6 from another viewing angle. FIG. 8 is a schematic top diagram of the rotating component in FIG. 2. Please refer to FIGS. 6 and 7 first. The rotating component 120 also includes a guide part 123, for example.

The guide part 123 is connected to the driving part 122, and the driving part 122 is located between the guide part 123 and the abutting part 121. The guide part 123 has a guide hole 1230, an open end 1231, and a connecting end 1232 (depicted in FIG. 6). The connecting end 1232 is opposite to the open end 1231 and connected to the driving part 122. The open end 1231 has an opening O. The guide hole 1230 extends from the open end 1231 to the connecting end 1232 and is communicated to the opening O and the cavity 1220. As shown in FIGS. 3 and 6, the diameter R1 of the guide hole 1230 gradually decreases from the open end 1231 to the connecting end 1232. Therefore, the convex part 1330 of the foot pad component 130 can more easily extend into the cavity 1220 of the rotating component 120 through the guide hole 1230. Further, the diameter of the opening O can be larger than the diameter R1 of the guide hole 1230 between the open end 1231 and the connecting end 1232, making it easier for the convex part 1330 of the foot pad component 130 to extend from the opening O into the guide hole 1230. In addition, because the diameter R1 of the guide hole 1230 gradually decreases from the open end 1231 to the connecting end 1232, an inner surface IS (also labeled in FIG. 6) inclined relative to the open end 1231 can be formed in the guide hole 1230. The inner surface IS can be used to allow the convex part 1330 to abut, thereby guiding the convex part 1330 to extend into the cavity 1220 of the driving part 122. Incidentally, in this embodiment, the shape of the guide part 123 may be in the form of a conical platform, but the shape of the guide part 123 may be in the form of a circular platform in another embodiment, and the present invention is not limited thereto.

Please refer to FIGS. 4 and 6 together. The abutting part 121 of this embodiment may have an actuating section 1210 and an abutting section 1211. The abutting section 1211 is connected between the actuating section 1210 and the driving part 122. The actuating section 1210 is located outside the housing 110 (depicted in FIG. 4), and the abutting section 1211 is located inside the housing 110. A portion 1110 of the first part 111 (depicted in FIG. 4) is sandwiched between the actuating section 1210 and the abutting section 1211 to prevent the rotating component 120 from falling off from the first part 111. For example, the portion 1110 of the first part 111 has a through hole H (also labeled in FIG. 3), and the rotating component 120 is arranged to pass through the through hole H, and the actuating section 1210 and the abutting section 1211 clamp the first part 111. Specifically, the abutting section 1211 may have a body part BP and a plurality of hook parts HP. The body part BP is connected between the actuating section 1210 and the driving part 122. Each hook part HP has a fixing end FE and a hook end HE opposite to each other. Each fixing end FE is fixed to the body part BP, and the hook end HE is located between the respective fixing end FE and the actuating section 1210. The hook end HE is separated from the body part BP and protrudes from the body part BP. The portion 1110 of the first part 111 is sandwiched between the actuating section 1210 and the hook end HE. The quantity of the hook parts HP is, for example, two in this embodiment, and the two hook parts HP can be arranged on the opposite sides of the abutting section 1211 along the radial direction R of the axis S (depicted in FIG. 4), respectively. In addition, the two hook ends HE each protrude from the body part BP along the radial direction R. Further, in the direction perpendicular to the axial direction A of the axis S of the rotating component 120 (e.g., the radial direction R shown in FIG. 4), the hook end HE forms the maximum width W1 of the abutting section 1211, and the maximum width W1 is greater than the diameter AP of the through hole H (also labeled in FIG. 3). In this way, the hook end HE can abut against the first part 111 in the housing 110, making the actuating section 1210 and the hook end HE more firmly clamp the first part 111, thereby further preventing the rotating component 120 from falling off from the first part 111. Incidentally, the hook part HP of this embodiment is integrated with the body part BP, but the present invention is not limited thereto.

Please refer to FIGS. 3 and 6 again. The abutting section 1211 further has a guiding end GE in this embodiment. The guiding end GE is connected to the driving part 122 and is opposite to the actuating section 1210. In the direction perpendicular to the axial direction A of the axis S of the rotating component 120 (e.g., the radial direction R shown in FIG. 3), the width W2 of the guiding end GE gradually increases from the driving part 122 to the actuating section 1210. In this way, the rotating component 120 can be more easily extended into the through hole H through the guiding end GE. Incidentally, the guidance end GE can be opposite to the hook end HE. In the direction perpendicular to the axial direction A of the axis S of the rotating component 120 (e.g., the radial direction R shown in FIG. 3), the width W3 of the abutting section 1211 between the guiding end GE and the hook end HE is smaller than the diameter AP, making it easier for the rotating component 120 to extend into the through hole H. The width W3 of the abutting section 1211 may be about 0.4 mm narrower than the diameter AP in one embodiment, but the present invention is not limited thereto.

Please refer to FIGS. 2 and 8 together. The actuating section 1210 of this embodiment may have a knob part K. The knob part K is embedded in the first part 111. In detail, the top T of the knob part K can be provided with an actuating structure AS (shown in FIG. 8), and the shape of the actuating structure AS can be grasped by fingers or inserted by coins. In one embodiment, the knob part K may protrude from the first part 111 and may not be provided with the actuating structure AS shown in FIG. 8; however, the present invention does not impose any limitations on the way to rotate the knob part K.

Compared to the conventional technology, the projection device 100 of this embodiment adopts a rotating component 120 and a foot pad component 130, the rotating component 120 can be arranged at the top of the housing 110 (the first part 111), the foot pad component 130 can be arranged at the bottom of the housing 110 (the second part 112) and embedded in the rotating component 120, and the rotating component 120 can drive the foot pad component 130 to rotate together. Thus, when adjusting the angle of the projection image of the projection device 100, the rotating component 120 can be rotated from the top of the housing 110 so that the foot pad component 130 is driven by the rotating component 120 to extend out or retract into the housing 110. By changing the height of the housing 110 relative to the foot pad part 131, the tilt angle of the projection image of the projection device 100 can be changed. Therefore, the projection device 100 of this embodiment can adjust the angle of the projection image from the top of the housing 110, thereby having the advantages of easy operation and simple structure.

Figure 9:
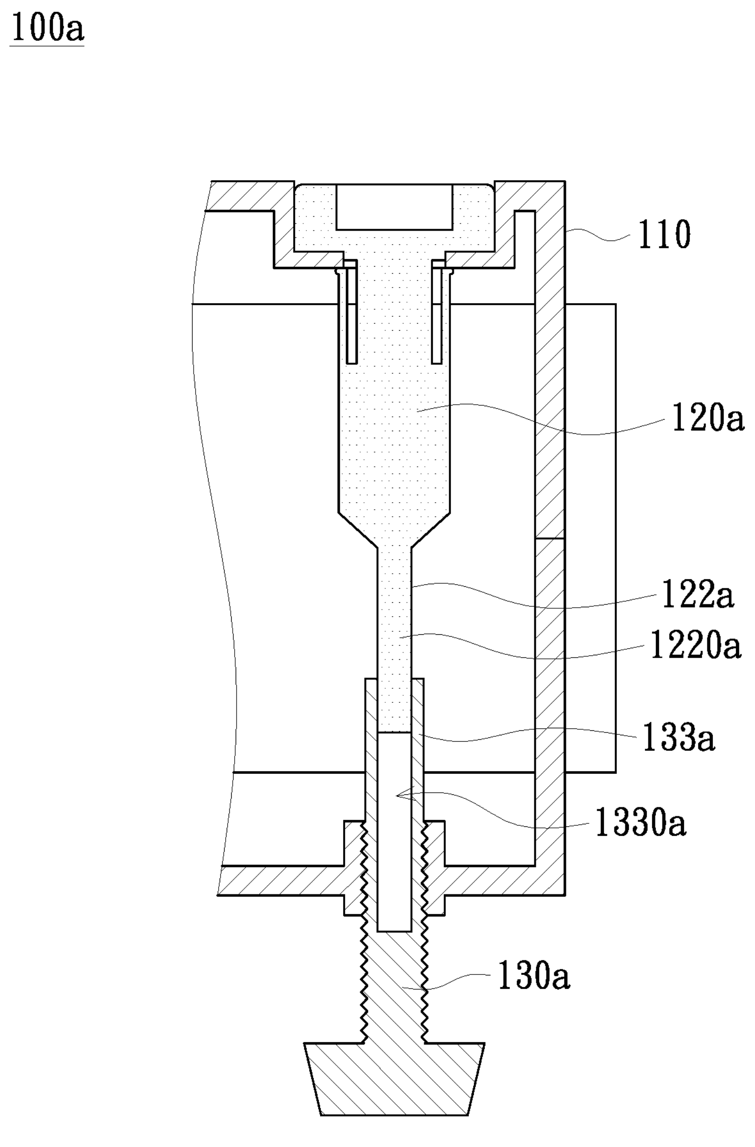
FIG. 9 is a schematic cross-sectional diagram of a projection device in another embodiment of the present invention.

FIG. 9 is a schematic cross-sectional diagram of a projection device in another embodiment of the present invention. The structure and advantages of the projection device **100*a* in this embodiment are similar to those of the embodiment in FIG. 1, and only the differences will be described below. Please refer to FIG. 9. The driving part 122*a* of the rotating component 120*a* may have a convex part 1220*a*, and the driven-to-move part 133*a*** of the foot pad component

130*a* may have a cavity 1330*a*. The cavity 1330*a* is configured to accommodate the convex part 1220*a* to cause the driving part 122*a* to be embedded with the driven-to-move part 133*a*. The features of the convex part 1220*a* and the cavity 1330*a* have been described above, and no redundant detail is to be given herein. It can be understood that the driven-to-move part 133*a* of this embodiment can be additionally provided with the guide part 123 in FIG. 1, so that the convex part 1220*a* is easier to extend into the cavity 1330*a*. Similarly, the features of the guide part 123 have been described above, and no redundant detail is to be given herein.

Figure 10:
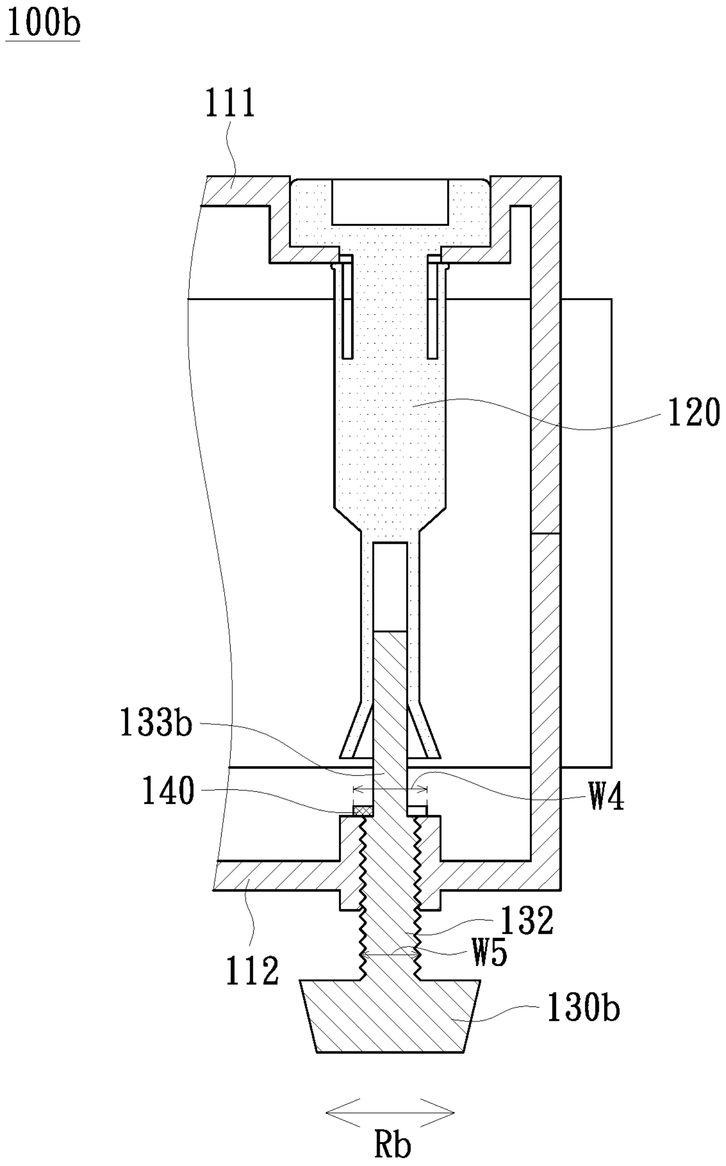
FIG. 10 is a schematic cross-sectional diagram of a projection device in another embodiment of the present invention.
Figure 11:
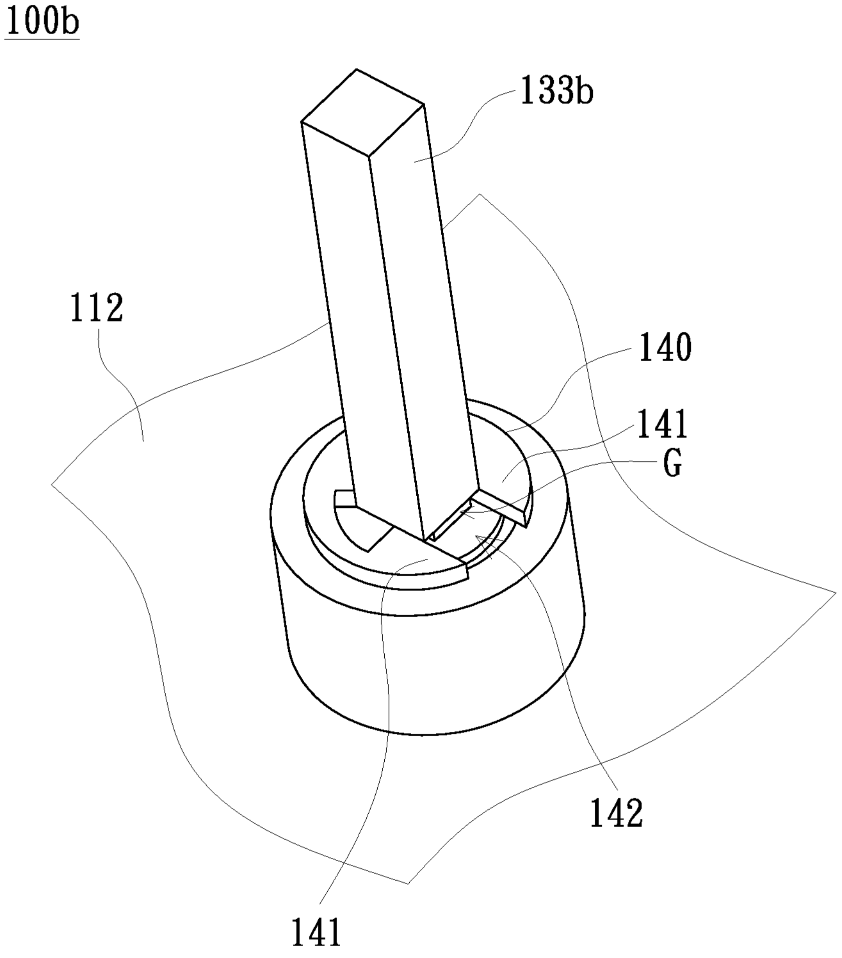
FIG. 11 is a schematic diagram of the limiting ring in FIG. 10 sleeved on the driven-to-move part.
Figure 12:
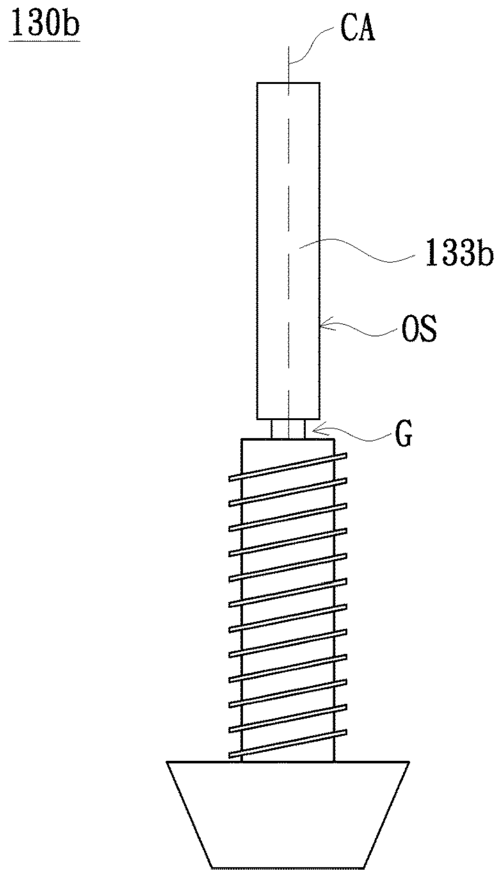
FIG. 12 is a schematic diagram of the foot pad component in FIG. 10.
Figure 13:
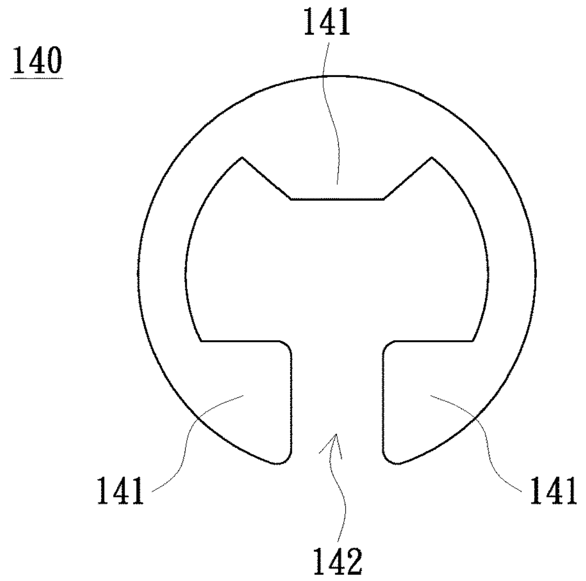
FIG. 13 is a schematic diagram of the limiting ring in FIG. 10.

FIG. 10 is a schematic cross-sectional diagram of a projection device in another embodiment of the present invention. FIG. 11 is a schematic diagram of the limiting ring in FIG. 10 sleeved on the driven-to-move part. FIG. 12 is a schematic diagram of the foot pad component in FIG. 10. FIG. 13 is a schematic diagram of the limiting ring in FIG. 10. The structure and advantages of the projection device 100*b* in this embodiment are similar to those of the embodiment in FIG. 1, and only the differences will be described below. Please refer to FIGS. 10 and 11 first. The projection device 100*b* further includes a limiting ring 140, for example. The limiting ring 140 is sleeved on the actuating part 133*b* of the foot pad component 130*b* and abutted against the screw rod part 132. As shown in FIG. 10, in the radial direction Rb of the screw rod part 132, the width W4 of the limiting ring 140 is greater than the width W5 of the screw rod part 132. In this way, it can further prevent the screw rod part 132 from detaching from the second part 112 of the housing 110 due to being continuously driven by the rotating component 120. Please refer to FIGS. 12 and 13 together. In detail, the driven-to-move part 133*b* can be rod-shaped, and the driven-to-move part 133*b* can have a central axis CA and an outer side OS. It should be noted that the driven-to-move part 133*b* is depicted as the convex part 1330 in FIG. 1 in this embodiment, but the present invention is not limited thereto. The outer side OS of this embodiment surrounds the central axis CA of the driven-to-move part 133*b*. The outer surface OS has a groove G, and the limiting ring 140 has a convex portion 141 corresponding to the groove G. As shown in FIG. 11, the limiting ring 140 is sleeved to the groove G, and the convex portion 141 is abutted against the interior of the groove G. In this way, it can prevent the limiting ring 140 from detaching from the groove G due to being pushed by the second part 112, thereby making the limiting ring 140 more firmly sleeved to the driven-to-move part 133*b*. The limiting ring 140 of this embodiment has three convex portions 141 as shown in FIG. 13, but it can be understood that the present invention does not limit the quantity of the convex portions 141. Please refer to FIGS. 11 and 13 together. Incidentally, the limiting ring 140 has a fracture 142, which corresponds to the driven-to-move part 133*b*. The limiting ring 140 is configured to be sleeved to the actuating part 133*b* through the fracture 142. For example, the limiting ring 140 can be sleeved and clamped to the driven-to-move part 133*b* through the fracture 142. However, the present invention does not impose any restrictions on the installation method of the limiting ring 140.

In summary, the projection device of the present invention adopts a rotating component and a foot pad component, the rotating component can be arranged at the top of the housing (the first part), the foot pad component can be arranged at the bottom of the housing (the second part) and embedded in the rotating component, and the rotating component can drive the foot pad component to rotate together. Thus, when adjusting the angle of the projection image of the projection device, the rotating component can be rotated from the top of the housing so that the foot pad component is driven by the rotating component to extend out or retract into the housing. By changing the height of the housing relative to the foot pad part, the tilt angle of the projection image of the projection device can be changed. Therefore, the projection device of the present invention can adjust the angle of the projection image from the top of the housing, thereby having the advantages of easy operation and simple structure.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A projection device, comprising:

a housing, having a first part and a second part disposed on opposite sides of the housing, wherein the second part has a screw hole;

a rotating component, having an abutting part and a driving part connected to each other, wherein the abutting part is arranged to pass through and abut against the first part, and the driving part is located inside the housing, the abutting part has an actuating section and an abutting section, the abutting section is connected between the actuating section and the driving part, the actuating section is located outside the housing, the abutting section is located inside the housing, and a portion of the first part is sandwiched between the actuating section and the abutting section; and a foot pad component, having a foot pad part, a screw rod part, and a driven-to-move part, wherein the screw rod part is connected between the foot pad part and the driven-to-move part and is screwed to the second part through the screw hole, the driven-to-move part is located in the housing and is embedded in the driving part, and the foot pad part is located outside the housing;

wherein the rotating component is configured to rotate relative to the first part, causing the foot pad component to be driven by the rotating component to rotate relative to the second part, thereby adjusting a distance of the housing relative to the foot pad part.

2. The projection device according to claim 1, wherein one of the driving part and the driven-to-move part has a cavity, and the other one of the driving part and the driven-to-move part has a convex part, and the cavity is configured to accommodate the convex part so that the driving part is embedded with the driven-to-move part.

3. The projection device according to claim 2, wherein the convex part has a complementary shape with the cavity, and the convex part is configured to cause the driving part to drive the driven-to-move part to rotate when the rotating component rotates.

4. The projection device according to claim 2, wherein the rotating component further comprises a guide part, the guide part is connected to the driving part, the driving part is located between the guide part and the abutting part, the guide part has a guide hole, an open end, and a connecting end, the connecting end is opposite to the open end and connected to the driving part, the open end has an opening, the guide hole extends from the open end to the connecting end and is communicated to the opening and the cavity, and a diameter of the guide hole gradually decreases from the open end to the connecting end.

5. The projection device according to claim 2, wherein the convex part and the cavity are clearance fit with each other.

6. The projection device according to claim 2, wherein a length of the cavity in an axial direction of an axis of the rotating component is smaller than a length of the screw rod part in the axial direction of the axis of the rotating component.

7. The projection device according to claim 1, wherein the abutting section has a body part and a plurality of hook parts, the body part is connected between the actuating section and the driving part, each of the hook parts has a fixing end and a hook end opposite to each other, each of the fixing ends is fixed to the body part, the hook ends are respectively located between the fixing ends and the actuating section, the hook ends are separated from the body part and protruding from the body part, and the portion of the first part is sandwiched between the actuating section and the hook ends.

8. The projection device according to claim 7, wherein the portion of the first part has a through hole, the rotating component is arranged to pass through the through hole, wherein in an axial direction perpendicular to an axis of the rotating component, the hook ends form a maximum width of the abutting section, and the maximum width is greater than a diameter of the through hole.

9. The projection device according to claim 8, wherein the abutting section further has a guiding end, the guiding end is connected to the driving part and opposite to the actuating section, wherein in the axial direction perpendicular to the axis of the rotating component, a width of the guiding end gradually increases from the driving part to the actuating section.

10. The projection device according to claim 9, wherein the guiding end is opposite to the hook ends, wherein in the axial direction perpendicular to the axis of the rotating component, a width of the abutting section between the guiding end and the hook ends is smaller than the diameter of the through hole.

11. The projection device according to claim 1, wherein the actuating section has a knob part, and the knob part protrudes or is embedded in the first part.

12. The projection device according to claim 1, wherein the housing further has a projection side and a back side opposite to each other, and the rotating component and the foot pad component are arranged close to the projection side.

13. A projection device, comprising:

a housing, having a first part and a second part disposed on opposite sides of the housing, wherein the second part has a screw hole;

a rotating component, having an abutting part and a driving part connected to each other, wherein the abutting part is arranged to pass through and abut against the first part, and the driving part is located inside the housing;

a foot pad component, having a foot pad part, a screw rod part, and a driven-to-move part, wherein the screw rod part is connected between the foot pad part and the driven-to-move part and is screwed to the second part through the screw hole, the driven-to-move part is located in the housing and is embedded in the driving part, and the foot pad part is located outside the housing; and a limiting ring, sleeved on the driven-to-move part and abutting against the screw rod part, wherein in a radial direction of the screw rod part, a width of the limiting ring is greater than a width of the screw rod part;

wherein the rotating component is configured to rotate relative to the first part, causing the foot pad component to be driven by the rotating component to rotate relative to the second part, thereby adjusting a distance of the housing relative to the foot pad part.

14. The projection device according to claim 13, wherein the driven-to-move part is rod-shaped, the driven-to-move part has a central axis and an outer surface, the outer surface surrounds the central axis, the outer surface has a groove, the limiting ring has a convex portion corresponding to the groove, the limiting ring is sleeved to the groove, and the convex portion is abutted against an interior of the groove.

15. The projection device according to claim 13, wherein the limiting ring has a fracture, the fracture corresponds to the driven-to-move part, and the limiting ring is configured to be sleeved to the driven-to-move part through the fracture.

* * * * *